United States Patent

Sterly

[15] 3,661,396

[45] May 9, 1972

[54] DIRECTIONAL CONTROL SWITCH MEANS FOR A CASSETTE CHANGER

[72] Inventor: Glenn E. Sterly, Carol Stream, Ill.

[73] Assignee: Ampex Corporation, Redwood City, Calif.

[22] Filed: Nov. 10, 1969

[21] Appl. No.: 875,375

[52] U.S. Cl. ....................274/4 D

[51] Int. Cl. ....................G11b 15/26

[58] Field of Search ....................242/198, 199, 200; 274/4 R, 274/4 C, 4 E, 4 F, 11; 226/49, 50

[56] References Cited

UNITED STATES PATENTS

| | | | |
|---|---|---|---|
| 3,127,178 | 3/1964 | Osborn et al. | 274/4 F |
| 3,533,633 | 10/1970 | Wilder | 274/4 D |

FOREIGN PATENTS OR APPLICATIONS

| | | | |
|---|---|---|---|
| 1,578,053 | 7/1969 | France | 274/4 F |

*Primary Examiner*—Harry N. Haroian

*Attorney*—Luedeka, Fitch, Even & Tabin and Robert G. Clay

[57] ABSTRACT

A cassette changer, which is shiftable between a pause mode and an operational mode, is provided with directional control switch means which remain in given positions during shifting to a pause mode to assure that the same direction of tape drive is resumed upon termination of the pause mode. Preferably, the directional control switches are interconnected by a mechanical means in the form of a rocker arm which extends between the switches to shift and to assure that the switches are mutually exclusively operated to opposite positions.

7 Claims, 5 Drawing Figures

INVENTOR
Glenn E. Sterly

Anderson, Luedeka, Fitch, Even & Tabin ATTYS.

INVENTOR
Glenn E. Sterly

Anderson, Luedeka, Fitch, Even & Tabin ATTYS

INVENTOR
Glenn E. Sterly

Anderson, Luedeka, Fitch, Even & Tabin ATTYS.

DIRECTIONAL CONTROL SWITCH MEANS FOR A CASSETTE CHANGER

This invention relates to a cassette changer apparatus having a magazine for storing cassettes which are automatically transferred between the magazine and a station for playback or recording and, more particularly, to a directional control means for controlling a sound system and for indicating the direction in which the tape is moving or will move when playing or recording is underway.

With a cassette changer capable of forward or reverse play, i.e., bidirectional play, operator error is reduced and better, more foolproof operation is provided by indicating visually the direction in which the tape is presently feeding or the direction in which the tape was previously feeding if the tape feed is momentarily stopped, as when the cassette changer is in a "standby" or "pause" condition. By alerting the operator as to the direction in which the tape is feeding or will continue to feed when recording or playback operations are resumed, the operator is in a better position to avoid errors in operating the apparatus such as erasing or playing in the wrong direction because of a wrong assumption as to the direction of tape movement.

Where more than a single track is present on the tape, it is important that the electrical switching circuitry for the sound system be coordinated with a given track and its direction of transport. Therefore, the direction of tape feed and the electronic circuits must be properly remembered and resumed when a pause operation is terminated to prevent the sound transducer head from becoming magnetized or damaging circuits when playback or recording is resumed. Also, as is explained in greater detail in copending application Ser. No. 877,971 titled Track Selector System For A Cassette Playback Device filed Nov. 19, 1969, the directional control system and switches are particularly useful in allowing the operator to select modes of operation. For example, the operator may, at his option, select to play only a first track, only a second track or both the first and second tracks of each of cassette tapes in the magazine.

Accordingly, an object of the invention is to provide a directional control of the foregoing kind for a cassette changer.

Other objects and advantages of the invention will become apparent when taken in connection with the accompanying drawings in which.

Figure 1:
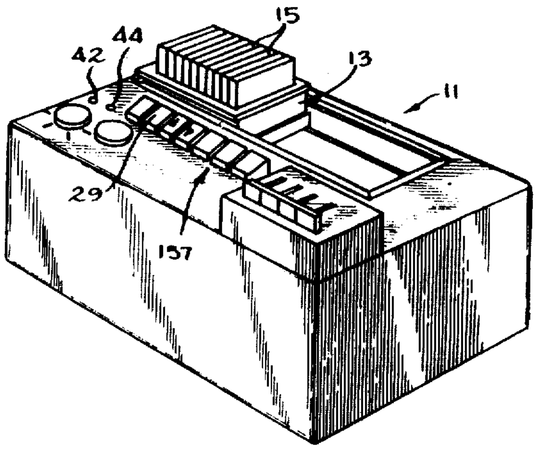
FIG. 1 is a perspective view of a cassette changer embodying the novel features of the invention.
Figures 3, 4:
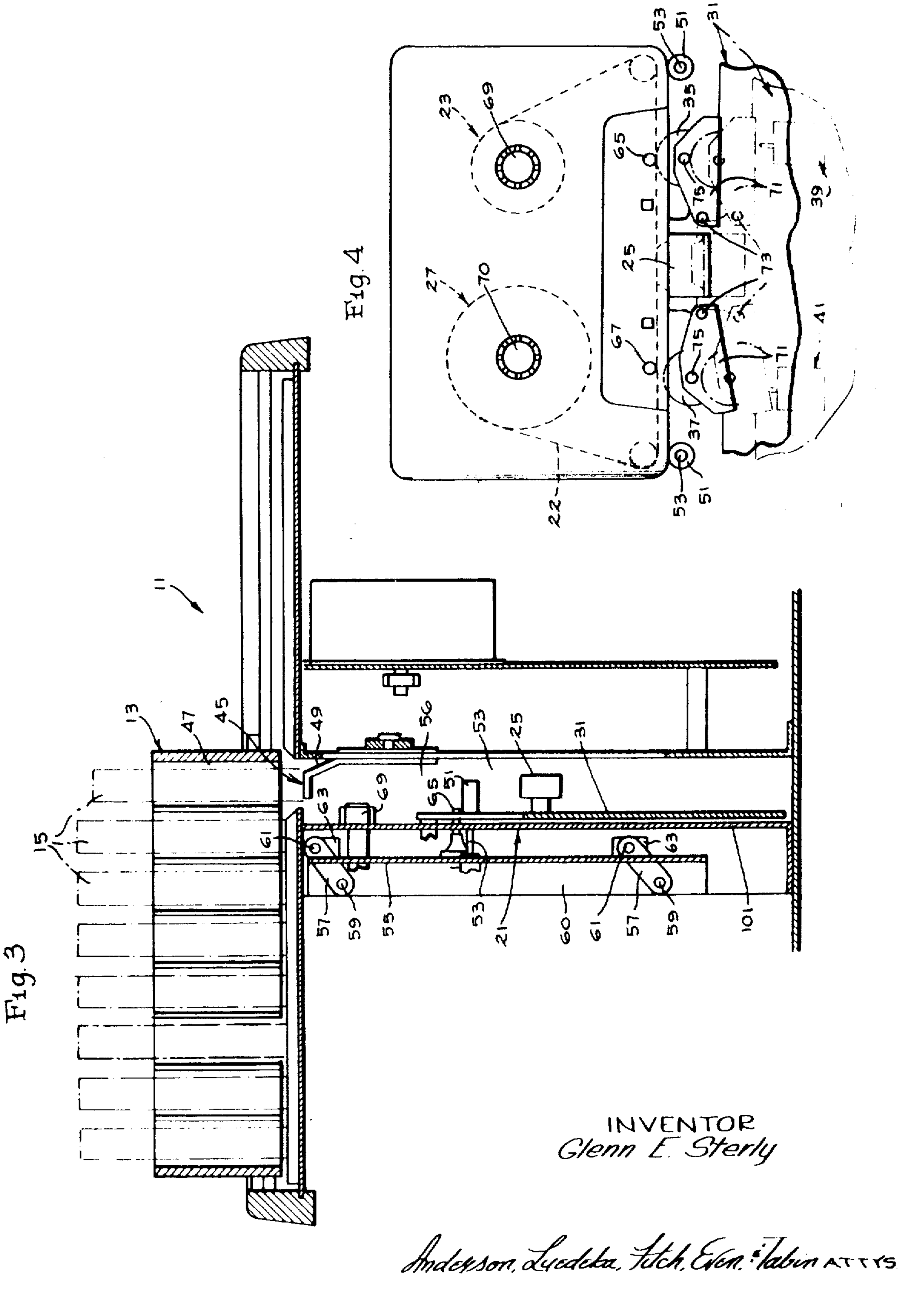
FIG. 3 is an enlarged partial longitudinal sectional view of the cassette changer of FIG. 1.
FIG. 4 illustrates a cassette and pause mechanism in operative and standby positions.

As shown in the drawings for purposes of illustration, the invention is embodied, very generally, in a cassette changer 11 having a magazine 13 on which are stored a series of tape cassettes 15 which are automatically transferred to and from the magazine by a shiftable chassis 21 (FIG. 3). The shiftable chassis 21 carries the cassette to a playing position within the interior of the cassette changer for playback or recording on a tape 22 which may be moved in a forward direction by unwinding from a first reel 23 and moved past a sound transducer head 25 and wound on a second reel 27. To record on or play back from the second side or track of the tape 22, the tape is fed in the reverse direction by unwinding from the second reel 27 and winding on the first reel 23 as the tape moves past the transducer head. Forward or reverse feed of the tape may be interrupted at any time during the playing thereof, by operating a pause selector 29 (FIG. 1) which shifts a pause carrier 31 (FIG. 3) carrying the transducer head 25 and selectively positionable forward pinch roller 35 (FIG. 4) and a reverse pinch roller 37 from operative association with the tape to a pause or standby position in which both of the pinch rollers are spaced from the tape.

Figure 2:
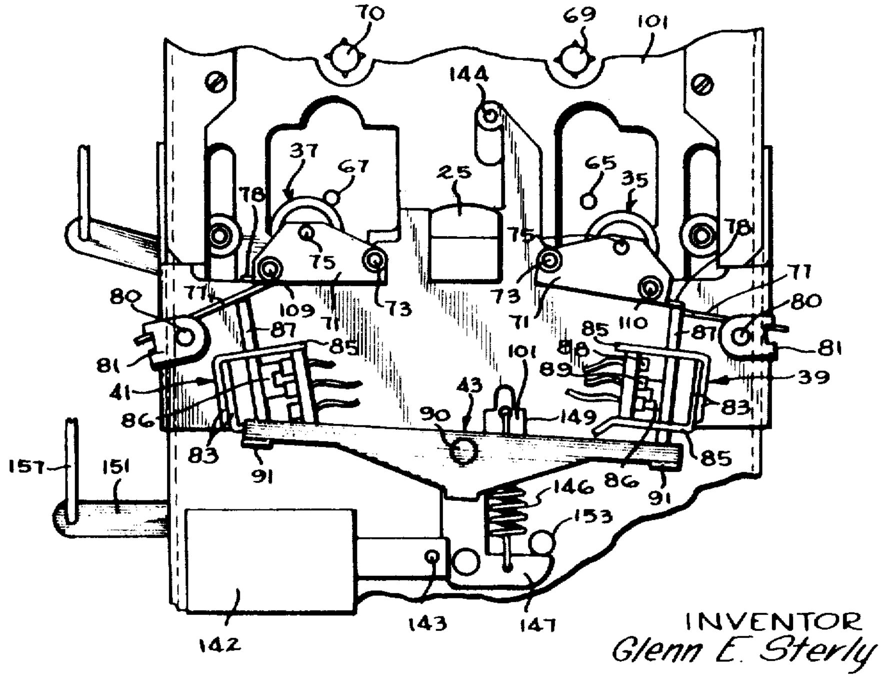
FIG. 2 is an enlarged fragmentary, partial view showing a pause carrier for the cassette changer of FIG. 1.

To assure that sound transducer head 25 will not become magnetized and that the tape feed direction is indicated to the operator and will resume in the same direction for the purpose of avoiding erasing or recording over valuable material on the tape, directional control means are provided to control and position switch means comprising forward and reverse feed, directional control switches 39 and 41, as best seen in FIG. 2. The switch 39 is associated with the forward feed pinch roller 35 and controls electronic circuits connected to the sound transducer head 25 to establish and maintain proper circuits cooperating with the first track of the tape and to light a forward signal light 42 on the cassette changer. In similar manner, the switch 41 is associated with the reverse feed pinch roller 37 and controls electronic circuits connected to sound transducer head 25 to establish and maintain proper circuits cooperating with the second track of the tape and to light a reverse signal light 44. Means in the form of a switch reversing lever or rocker arm 43 are provided between the respective directional control switches 39 and 41 to assure that when one directional control switch moves to one position that the opposite directional control switch moves to the other position. Thus, the directional control switches are mechanically interlocked by the rocker arm for mutually exclusive operation.

Referring now in greater detail to the individual elements of the invention, the cassette changer 11 is of the general type more fully disclosed in copending application titled "Cassette Lowering and Release Mechanism," Ser. No. 875,045 filed of even date and assigned to the same assignee in which is disclosed in greater detail the construction and operation of the shiftable chassis 21, which is generally of the type disclosed in U.S. Pat. No. 3,385,534, for supporting and lowering a cassette 15 received through a transfer slot 45, FIG. 3, from a magazine compartment 47 aligned with the transfer slot. As fully explained in the copending application, the cassette 15 will drop through the transfer slot to abut an elevator slider 49 positioned adjacent the transfer slot. The cassette is lowered by a motor driven mechanism for the elevator slider 49 until the lower and outer ends of the cassette abut and are supported on a pair of horizontally disposed supports in the form of tubes 51 (FIGS. 3 and 4) which are telescoped on rods 53 fixed at one end to a vertically extending chassis plate 55 of the movable chassis 21. When the cassette rests on the support tubes 51, which project across a vertically extending cassette receiving channel 56, motor driven cam drives (not shown) cause the movable chassis 21 to swing downwardly from the position illustrated in FIG. 2 with a parallelogram linkage chassis support formed by four links 57 pivoting in a clockwise direction as viewed in FIG. 3. The links 57 are pivotally mounted at lower ends to posts 59 fixed to a stationary frame wall 60 and are pivotally connected at their upper and outer ends by pivot pins 61 to brackets 63 on the movably chassis plate 55 of the movable chassis. As the movable chassis plate 55 swings down, it also simultaneously moves toward the plane of the cassette and is maintained in a vertical plane parallel to the plane of the cassette.

The movement of the movable chassis plate 55 towards the cassette causes a pair of tape capstans 65 and 67 to project into the cassette through openings therein to positions immediately behind the tape 22, that is, on the side of the tape opposite from the side engaged by the pinch rollers 35 and 37, as best seen in FIG. 4. Simultaneously with insertion of the capstans into the cassette 15, a pair of tape feed spindles 69 and 70 carried by the chassis plate 55 are inserted into central openings of the reels 23 and 27. Thus, the operative relationship between the tape capstans and tape feed spindles is established as the cassette is lowered into a position for cooperation with the transducer head 25 and pinch rollers on the pause carrier 31.

The pinch rollers 35 and 37 are similar in construction and operation but operate mutually exclusive, as above explained.

The pinch rollers are mounted for pivoting from a play position to an inoperative non-playing position by means of brackets 71 which are pivotally mounted at their inner ends on posts 73 which are fixed at one end to the pause carrier 31. The pinch roller brackets 71 are generally channel-shaped members with vertically extending side walls which are apertured to receive and hold pinch roller axles 75 on which are journaled the pinch rollers for free rotation about the respectively associated axles with the pinch roller inserted partially into the open channel and partially projecting thereabove for engagement with the tape 22. The respective pinch roller brackets 71 are biased toward the tape 22 by a biasing means in the form of coiled torsion springs having inwardly projecting ends 77 which are engaged with a pad 78 formed on outer free end of the respective pinch roller brackets to force the same toward and into engagement with the tape with a predetermined amount of pressure to assure feeding without damage to the tape. In this illustrated embodiment of the invention, the outer end portion of the leaf spring is wound about posts 80 fixed to the pause carrier 31 and then inserted into an opening to bear against a top wall of spring support bracket 81 attached to the pause carrier 31.

The directional switches 39 and 41 comprise U-shaped brackets formed from a pair of angle-shaped members having abutted vertically disposed legs 83 and spaced, horizontally extending legs 85. The latter legs 85 have vertically aligned slots therein through which project opposite ends of a switch slider 87 which is movable between a first (upper) position in which a U-shaped bus bar 86 thereon connects upper switch contacts 88 to intermediate switch contacts 89 to complete sound circuits and to light a directional light indicating the direction of tape feeding and a second lower position in which its upper tape feeding contact 88 is open and no longer closing the circuit for the sound system and its respective directional light indicating that direction of tape play. The upper end of each switch slider 87 projects upwardly to the actuating pad 78 on its associated pinch roller bracket 71. When the pinch roller bracket pivots downwardly towards its inoperative position, its pad 78 abuts the upper end of its associated switch slider 87 and forces it to slide downwardly relative to the fixed switch bracket and force the switch reversing lever 43 to pivot.

The switch reversing lever 43 is pivoted at the center thereof on a pin 90 on the pause carrier 31 and is formed with generally horizontally extending lever arms having slider engaging lugs 91 disposed beneath and in abutment with the lower ends of the respective switch sliders. Thus, when one switch slider slides down and opens its upper contact 88, the reversing lever 43 forces the other switch slider upwardly to the operative position illustrated in FIG. 2 to close its upper contact 88. Since there are no springs associated with either of the switch sliders 87 in this preferred embodiment of the invention, there is no biasing or possible malfunction due to failure to return to or from a position. Thus, the switch sliders are moved positively through mechanical devices such as a pinch roller bracket and the reversing switch lever 43 to assure that only a single switch is in the operative position and thereby preventing inadvertent misplay by the operator or a magnetization of the transducer head 25.

Figure 5:
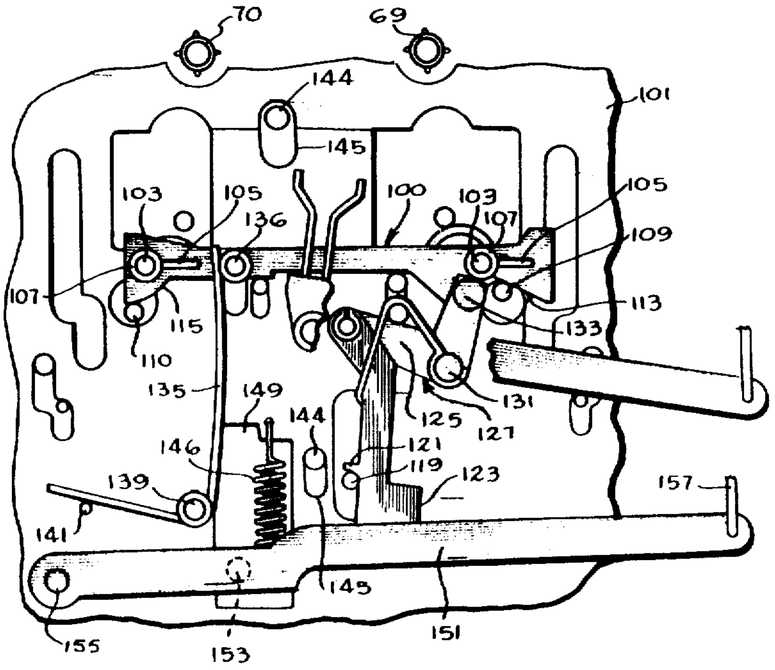
FIG. 5 illustrates a pause lever for shifting the pause carrier shown in FIG. 2.

The pinch rollers 35 and 37 are selectively positioned in the operative playing position or the inoperative position by means of a cam slider 100, illustrated in FIG. 5, carried on the reverse side of a stationary vertical wall 101 of the cassette changer. The cam slider is a narrow flat plate which is horizontally disposed and constrained for translation in the horizontal direction by means of a pair of horizontally spaced guide pins 103 fixed at their inner ends to the wall 101 and projecting into horizontally elongated slots 105 in the cam slider. Washers 107 fastened to the outer ends of the pins 103 hold cam slider on the pins for sliding relative to the wall 101. Cam follower pins 109 and 110 fixed at one end to the pinch roller brackets 71 project through openings in the pause plate and wall 101 for engagement with cam surfaces 113 and 115, respectively, on the cam slider. Each of the cam surfaces 113 and 115 formed at the ends of the cam force its associated cam follower and the pinch roller bracket downwardly against the urging of spring end 77 to an inoperative position when the cam slider is properly positioned. When the cam slider is in the position illustrated in FIG. 5, the cam 115 holds the follower 110 and its associated pinch roller 71 down against the force of the spring end 77 and in the inoperative position shown in FIG. 2. On the other hand, when the cam slider and cam 115 shift to the left, the cam follower 110 rises up along cam 115 and the pinch roller 35 rises to engage tape while the cam surface 113 forces the cam follower 109 down and swings pinch roller 37 from the tape and into an inoperative position.

The shifting of the cam slider 100 is controlled initially by movement of the movable chassis 21 to the operative position to cause the pinch roller 35 to be effective to feed the tape to play track 1. More specifically, during the downward movement of the movable chassis 21, a drive pin 119 (FIG. 5) fixed to the chassis plate 55 abuts a pawl tooth 121 on a pawl 123 pivoted at its upper end to an arm 125 of a bellcrank 127 pivotally mounted on a pivot post 131 fixed to the stationary plate 101. An upwardly extending arm of the bellcrank is pivotally connected by a pin 133 to the cam slider. Thus, downward movement of the pawl 123 is converted by the bellcrank into a leftward sliding of the cam slider 100 against the urging of a spring 135 having one end abutting a roll 136 on the cam slider. The spring 135 is mounted at a central coil on a post 139 with its other end abutting a pin 141 fixed to the wall 101. After track one of the tape is played, the motion of the tape stops and a tape motion sensor operates an electrical circuit for a solenoid 142 (FIG. 2) which retracts a solenoid plunger on which is fastened a pin 143 which then swings the pawl 123 clockwise, as viewed in FIG. 5, to a position in which the pawl tooth 121 is to the right of and unlatched from the pin 119. The spring 135 is now able to force the cam slider 100 to the right to shift the pinch rollers and cause feeding of track two of the tape. Thus, it will be seen that the cam slider 100 controls the pinch rollers and assures that only one of the pinch rollers at a time is in effective tape engaging position.

As was explained, the directional control switches 39 and 41 and pinch rollers 35 and 37 are carried by the pause carrier 31 between an upper playing position and a lowered pause position. The pause carrier 31 is constrained for vertical translation by guide rollers 144 inserted into vertically elongated slots 145 in the stationary plate 101 and is biased upwardly into operative play position by means of a contractile spring 146 having a lower end hooked into a laterally extending foot 147 at the bottom of the pause carrier 31. The spring 146 is disposed within an opening 149 in the pause carrier and has an upper end hooked to the plate 101. The spring 146 has sufficient strength to lift the pause carrier and bring that tape pinch roller, which is in its operative position, into tight engagement with the tape 22 and also move the transducer head 25 into position to play back or record upon the tape 22 moving between the cassette reels.

To shift the pause carrier 31 to the pause position against the urging of the spring 146, means in the form of a pause lever 151 with a laterally extending pin 153 thereon is moved down to abut the upper side of the foot 147 of the pause carrier and to force the latter downwardly. The pause lever is pivotally mounted at one end on a pivot stud 155 fixed to the wall 101. The opposite end of the pause lever is connected through a link 157 to the pause selector 29 (FIG. 1) on the control panel for the cassette whereby a pause operation may be initiated at any time during the playing of the track one or track two of the tape by operation of the selector 29.

From the foregoing, it will be seen that the present invention provides directional control for a cassette changer which is shiftable between a pause mode and an operational mode. When the pause carrier is shifted to the pause position, the previous direction of tape is maintained, remembered and indicated to the operator of the cassette changer by lighting one of the directional lights and extinguishing the opposite light.

Also, a switch reversing lever is provided which assures that when one switch moves to position, for playback or recording, the other switch moves from a playback or recording position to prevent magnetization or other harm coming to the transducer head and electronic circuitry.

While a preferred embodiment has been shown and described, it will be understood that there is no intent to limit the invention by such disclosure but, rather, it is intended to cover all modifications and alternate constructions falling within the spirit and scope of the invention as defined in the appended claims

What is claimed is:

1. In an apparatus for playing or recording on each of a series of tape cassettes having a pair of reels therein between which the tape is wound and unwound, the combination comprising a magazine for storing a series of cassettes and for positioning each of the cassettes at a transfer station for movement to an operating station, a sound transducer head, carrier means for carrying said transducer head between an operative position in which said transducer head is in operative relationship with said tape and a pause position in which said transducer head is spaced from operative relationship with said tape, a forward capstan for driving engagement with said tape, a forward tape feed member carried by said carrier means and selectively movable between an operative tape feeding position for engagement with said tape to force the tape against said forward capstan and an inoperative non-tape feeding position spaced form said tape, a reverse capstan for driving engagement with the tape, a reverse tape feed member carried by said carrier means and selectively movable between an operative tape feeding position for engagement with said tape to force the tape against said reverse capstan and an inoperative non-feeding position spaced from said tape, means for shifting one of said tape feed members to an operative position and the other to an inoperative position, first switch means operable by said forward tape feeding member to remain in its tape feeding position when said carrier means is in its operative or pause positions, second switch means operable by said reverse tape feeding member to remain in its tape feeding position when said carrier means is in the pause or operative positions, and means extending between said first and second switch means and operable to assure that said first and second switch means are in opposite positions.

2. An apparatus in accordance with claim 1 in which said last-mentioned means includes a rocker arm pivotally mounted on said carrier means for shifting therewith and for interaction with each of said first and second switch means while said carrier means is in said pause and operative positions thereby assuring said first and second switch means are in opposite positions relative to each other.

3. An apparatus in accordance with claim 2 in which said first and second switch means each have a slider movable in a first direction by its associated feed member and movable in the opposite direction by said rocker arm.

4. An apparatus in accordance with claim 3 in which pivotally mounted brackets support each of said tape feed members for swinging between said operative and inoperative positions and in which said brackets engage one end of an associated slider to move the same in said first direction.

5. An apparatus in accordance with claim 1 including forward and reverse feed signal indicators operable by said first and second switch means, respectively, to indicate the direction of tape feed.

6. In an apparatus for playing or recording on each of a series of tape cassettes having a pair of reels therein between which the tape is wound and unwound, the combination comprising a magazine for storing a series of cassettes and for positioning each of the cassettes at a transfer station for movement to an operating station, a carrier shiftable between an operative and a pause position, a forward tape feeding means including a capstan and also including a pinch roller mounted on said carrier for feeding said tape forwardly and movable between a tape feeding position with said capstan and a non-tape feeding position spaced from said capstan, a sound transducer head mounted on said carrier for shifting therewith, a reverse feeding means including a capstan and also including a pinch roller mounted on said carrier for feeding said tape in the reverse direction and movable between a tape feeding position with its associated capstan and a non-tape feeding position spaced from its associated capstan, means for shifting one of said pinch rollers into the tape feeding position and shifting the other pinch roller into the non-tape feeding position, forward switch means including a slider shiftable by movement of said forward pinch roller from a tape feeding to a non-tape feeding position, reverse switch means including a slider shiftable by movement of said reverse pinch roller from a tape feeding to a non-tape feeding position, and rocker means pivotally mounted on said carrier and extending into engagement with each of said sliders and pivotable by the slider being shifted to said non-tape feeding position to force the other slider to the tape feeding position and thereby maintain said switch means in mutually exclusive positions when said carrier is in said operative or said pause position.

7. An apparatus in accordance with claim 6 including forward and reverse feed signal indicators operable by said forward and reverse switch means to indicate the direction the tape is feeding when said carrier is in the operative position and the direction the tape will feed when said carrier is shifted from said pause position.

* * * * *